(12) United States Patent
Albright et al.

(10) Patent No.: US 11,780,557 B2
(45) Date of Patent: Oct. 10, 2023

(54) SYSTEM AND METHOD FOR FORMING A SEAL BETWEEN STRUCTURAL COMPONENTS

(71) Applicant: The Boeing Company, Chicago, IL (US)

(72) Inventors: Justin Albright, La Mirada, CA (US); David Witt, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 16/843,483

(22) Filed: Apr. 8, 2020

(65) Prior Publication Data
US 2021/0316839 A1    Oct. 14, 2021

(51) Int. Cl.
| | |
|---|---|
| B29C 45/14 | (2006.01) |
| B64C 7/00 | (2006.01) |
| B29C 45/00 | (2006.01) |
| B29C 45/26 | (2006.01) |
| B29C 65/54 | (2006.01) |
| B29L 31/26 | (2006.01) |

(52) U.S. Cl.
CPC ............ *B64C 7/00* (2013.01); *B29C 45/0046* (2013.01); *B29C 45/2608* (2013.01); *B29C 65/54* (2013.01); *B29L 2031/26* (2013.01)

(58) Field of Classification Search
CPC ....... B29C 65/54; B29C 65/542; B29C 65/56; B29C 65/565; B29C 65/7823; B29C 33/14; B29C 33/18; B29C 66/00; B29C 66/00145; B29C 66/81455; B29C 66/851; B29C 66/8511; B64C 3/24
See application file for complete search history.

(56) References Cited

U.S. PATENT DOCUMENTS

| | | | | |
|---|---|---|---|---|
| 5,318,422 A | * | 6/1994 | Erland | B29C 70/44 |
| | | | | 425/389 |
| 2015/0239193 A1 | * | 8/2015 | Heath | B29C 45/03 |
| | | | | 264/328.16 |
| 2016/0176085 A1 | * | 6/2016 | Brok | B29C 45/14418 |
| | | | | 244/119 |
| 2018/0208329 A1 | * | 7/2018 | Bots | B29C 65/565 |

* cited by examiner

*Primary Examiner* — Thu-Khanh T. Nguyen
(74) *Attorney, Agent, or Firm* — McDonnell Boehnen Hulbert & Berghoff LLP

(57) ABSTRACT

A method for forming a seal between structural components includes placing a retainer flap on a first side of a first structural component over a first channel within the first structural component and over a second channel within the first structural component such that the retainer flap, the first side of the first structural component, and a second structural component form a cavity. The first channel extends between the first side of the first structural component and a second side of the first structural component that is opposite the first side. The second channel extends between the first side of the first structural component and the second side of the first structural component. The method also includes evacuating the cavity through the first channel, thereby forcing the retainer flap against the second structural component and forcing a sealant to flow through the second channel into the cavity.

21 Claims, 9 Drawing Sheets

```
┌─────────────────────────────────────────────────────────────┐
│        PLACING A RETAINER FLAP ON A FIRST SIDE OF A FIRST   │
│   STRUCTURAL COMPONENT OVER A FIRST CHANNEL WITHIN THE      │
│  FIRST STRUCTURAL COMPONENT AND OVER A SECOND CHANNEL       │
│    WITHIN THE FIRST STRUCTURAL COMPONENT SUCH THAT THE      │
│     RETAINER FLAP, THE FIRST SIDE OF THE FIRST STRUCTURAL   │
│  COMPONENT, AND A SECOND STRUCTURAL COMPONENT FORM A        │
│    CAVITY, WHEREIN THE FIRST CHANNEL EXTENDS BETWEEN THE    │
│       FIRST SIDE OF THE FIRST STRUCTURAL COMPONENT AND A    │
│    SECOND SIDE OF THE FIRST STRUCTURAL COMPONENT THAT IS    │
│   OPPOSITE THE FIRST SIDE, AND WHEREIN THE SECOND CHANNEL   │
│      EXTENDS BETWEEN THE FIRST SIDE OF THE FIRST STRUCTURAL │
│    COMPONENT AND THE SECOND SIDE OF THE FIRST STRUCTURAL    │
│                         COMPONENT                           │
└─────────────────────────────────────────────────────────────┘
  202

┌─────────────────────────────────────────────────────────────┐
│    EVACUATING THE CAVITY THROUGH THE FIRST CHANNEL,         │
│  THEREBY FORCING THE RETAINER FLAP AGAINST THE SECOND       │
│                  STRUCTURAL COMPONENT                       │
└─────────────────────────────────────────────────────────────┘
  204

┌─────────────────────────────────────────────────────────────┐
│  FORCING A SEALANT TO FLOW THROUGH THE SECOND CHANNEL       │
│                      INTO THE CAVITY                        │
└─────────────────────────────────────────────────────────────┘
  206
```

CONNECTING A PUMP TO THE FIRST CHANNEL AT THE SECOND SIDE OF THE FIRST STRUCTURAL COMPONENT

SYSTEM AND METHOD FOR FORMING A SEAL BETWEEN STRUCTURAL COMPONENTS

FIELD

The present disclosure generally relates to systems and methods for forming a seal between structural components, and more specifically to systems and methods for forming a seal between aircraft structural components.

BACKGROUND

Some aircraft wing box structures present manufacturing difficulties. For example, it is typically beneficial to seal interfaces between structural components within the wing box to prevent rain or deicing chemicals from leaking into cavities within the wing box and to prevent loss of fuel held in the wing. However, sealing interfaces can involve a technician awkwardly maneuvering his or her body into a confined space to be in a position to apply sealant to the interface. This sealing of interfaces generally must be done at numerous locations throughout the wing box. This sealing of interfaces is time-consuming, can cause ergonomic issues, and can sometimes result in technicians bumping into wing box structural components.

As such, a need exists for systems and methods for forming a seal between structural components that are more efficient and safer.

SUMMARY

One aspect of the disclosure is a method for forming a seal between structural components, the method comprising: placing a retainer flap on a first side of a first structural component over a first channel within the first structural component and over a second channel within the first structural component such that the retainer flap, the first side of the first structural component, and a second structural component form a cavity, wherein the first channel extends between the first side of the first structural component and a second side of the first structural component that is opposite the first side, and wherein the second channel extends between the first side of the first structural component and the second side of the first structural component; evacuating the cavity through the first channel, thereby forcing the retainer flap against the second structural component; and forcing a sealant to flow through the second channel into the cavity.

Another aspect of the disclosure is a system for forming a seal between structural components, the system comprising: a first structural component comprising: a first channel formed between a first side of the first structural component and a second side of the first structural component that is opposite the first side; and a second channel formed between the first side of the first structural component and the second side of the first structural component; a second structural component; a retainer flap, wherein the retainer flap, the first side of the first structural component, and the second structural component form a cavity; and a sealant positioned within the first channel, the cavity, and the second channel.

Yet another aspect of the disclosure is a method for forming a seal between structural components, the method comprising: forming a first channel within a first structural component, the first channel extending between a first side of the first structural component and a second side of the first structural component that is opposite the first side; forming a second channel within the first structural component, the second channel extending between the first side of the first structural component and the second side of the first structural component; placing a retainer flap on the first side of the first structural component over the first channel and over the second channel such that the retainer flap, the first side of the first structural component, and a second structural component form a cavity; evacuating the cavity through the first channel, thereby forcing the retainer flap against the second structural component; and forcing a sealant to flow through the second channel into the cavity.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 is a block diagram of a method, according to an example.

FIG. 7 is a block diagram of a method, according to an example.

DETAILED DESCRIPTION

Figure 1A:
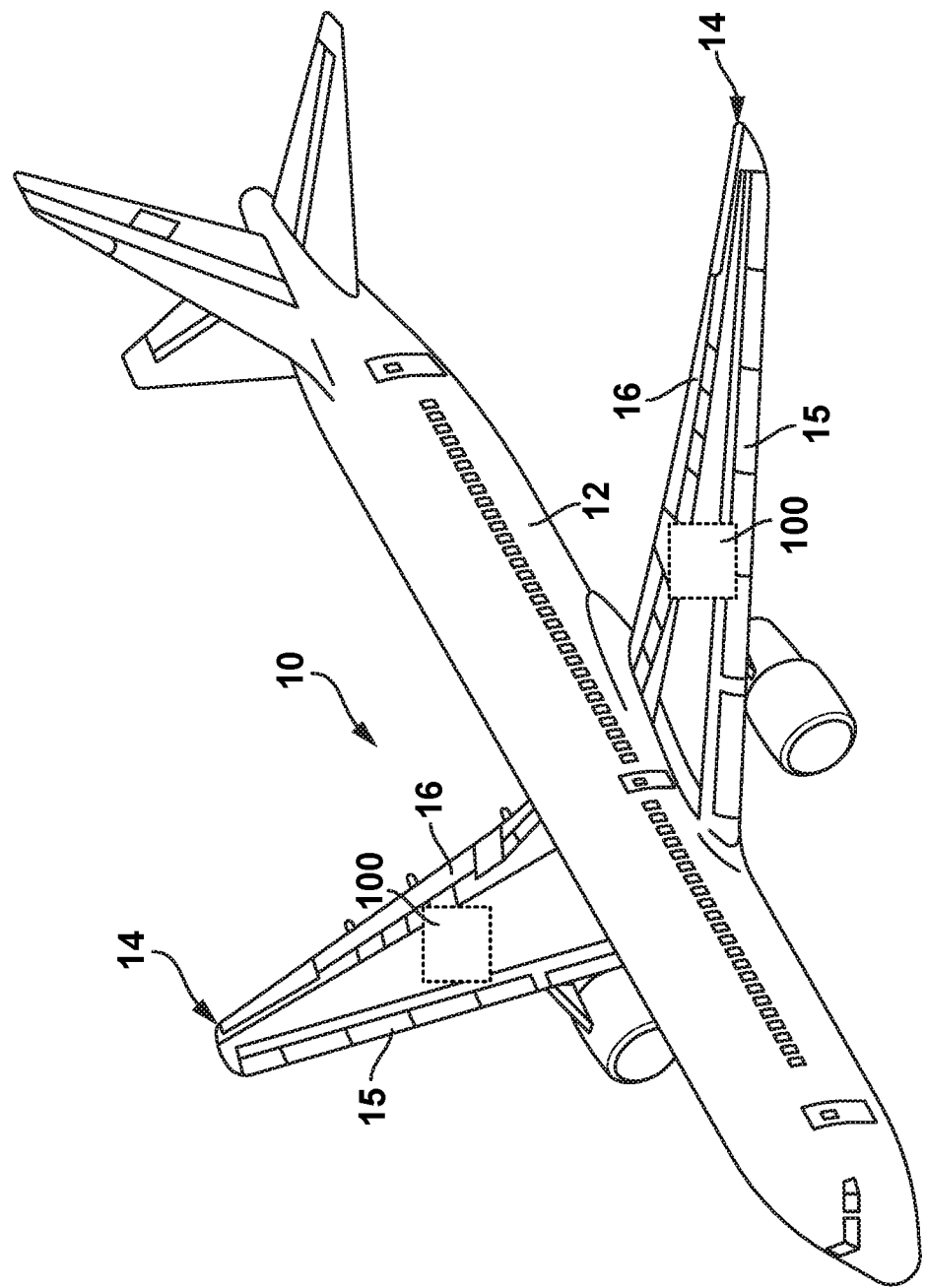
FIG. 1A is a schematic diagram of an aircraft, according to an example.

As discussed above, there exists a need for systems and methods for forming a seal between structural components that are more efficient and safer than conventional systems and methods.

Examples disclosed herein include a method for forming a seal between structural components. The method includes forming a first channel (e.g., drilling a hole) within a first structural component such as a wing spar. The first channel extends between a first side (e.g., an inward-facing side) of the first structural component and a second side (e.g., an outward-facing side) of the first structural component that is opposite the first side. The method also includes forming a second channel (e.g., drilling a hole) within the first structural component. The second channel extends between the first side of the first structural component and the second side of the first structural component. The second channel is typically inboard or outboard with respect to the first channel. The method also includes placing a retainer flap (e.g., a flexible and fluid impermeable flap) on the first side of the first structural component over the first channel and over the second channel such that the retainer flap, the first side of the first structural component, and a second structural component (e.g., such as a wing skin) form a cavity. The method also includes evacuating (e.g., pumping out) the cavity through the first channel, thereby forcing the retainer flap against the second structural component. The method also includes forcing a sealant (e.g., silicone, polyurethane, neoprene, epoxy, acrylic/nitrile, methacrylate, polyamide, polysulfide, dichromate, polyethylene, polysulfide manganese dioxide, fluorosilicone, polythioether, fluorocarbon, and/or epichlorohydrin resin) to flow through the second channel into the cavity.

As air is removed from the cavity to flow out of the first channel, sealant flows into the cavity (e.g., from a container that is connected to the second channel at the second side of the first structural member). The negative pressure created by evacuating the cavity can cause the retainer flap to form a seal with the second structural component. The sealant appearing at the second side end of the first channel typically indicates that the cavity, the first channel, and the second channel have all been filled with sealant.

As such, examples disclosed herein also include a system for forming a seal between structural components. The system includes a first structural component such as a wing spar. The first structural component includes a first channel formed between a first side of the first structural component and a second side of the first structural component that is opposite the first side. The first structural component also includes a second channel formed between the first side of the first structural component and the second side of the first structural component. The system also includes a second structural component such as a wing skin. The system also includes a retainer flap, where the retainer flap, the first side of the first structural component, and the second structural component form a cavity, with a sealant being positioned within the first channel, the cavity, and the second channel.

The aforementioned methods and systems can be advantageous when compared to conventional methods and systems because the use of the aforementioned methods and systems can be more efficient and safer (e.g., more ergonomically friendly) than conventional systems and methods.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-5 depict components of and functionality related to an aircraft and/or a system.

FIG. 1A is a schematic diagram of an aircraft 10, according to an example. The aircraft 10 could be a commercial airliner, but other examples are possible. The aircraft 10 includes a system 100. The aircraft 10 further includes a fuselage 12 and wings 14. The wings 14 each include a leading edge 15 and a trailing edge 16.

Figure 1B:
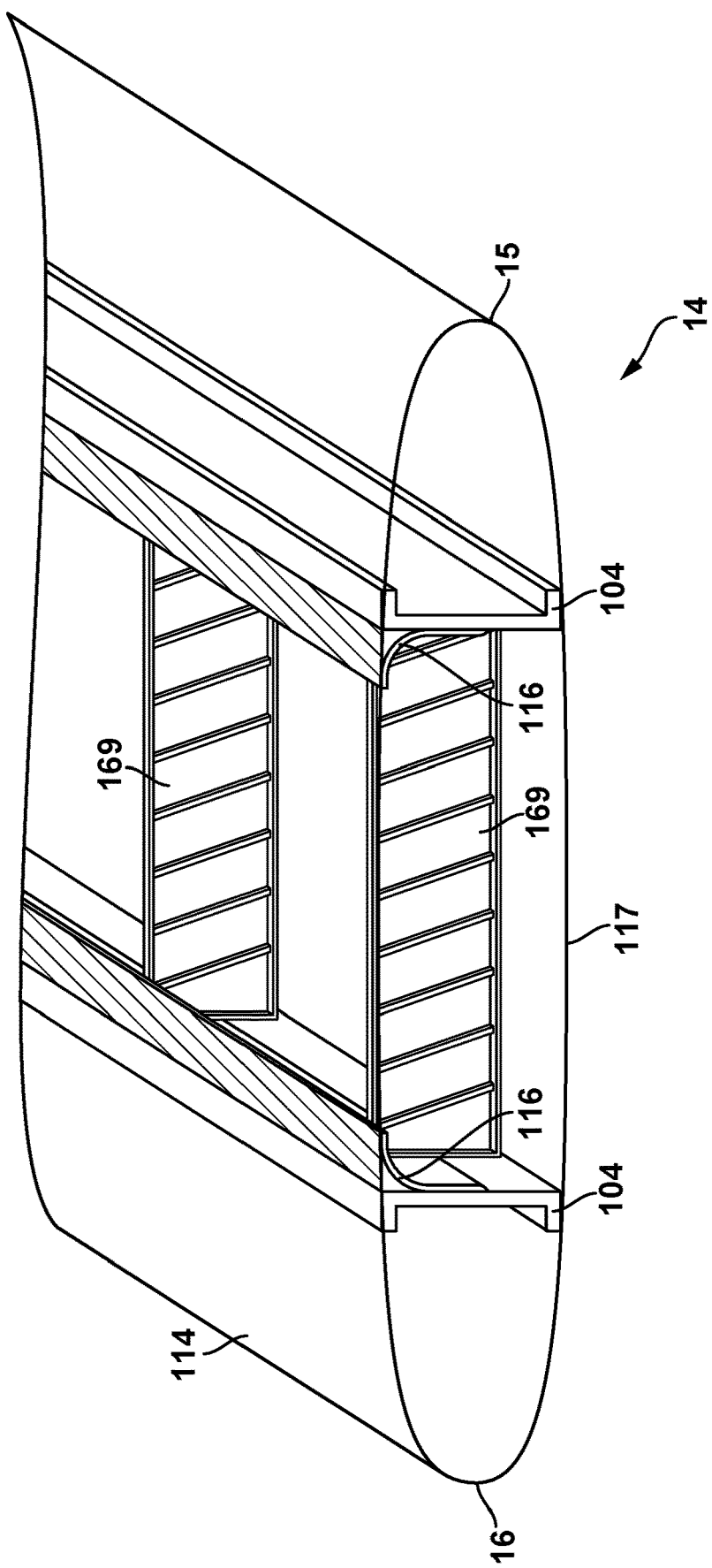
FIG. 1B is a perspective view of a wing, according to an example.

FIG. 1B is a perspective view of the wing 14. The wing 14 includes first structural components 104 (e.g., spars), a second structural component 114 (e.g., an upper wing skin), a lower wing skin 117, retainer flaps 116, and ribs 169, as described in more detail below.

Figure 2:
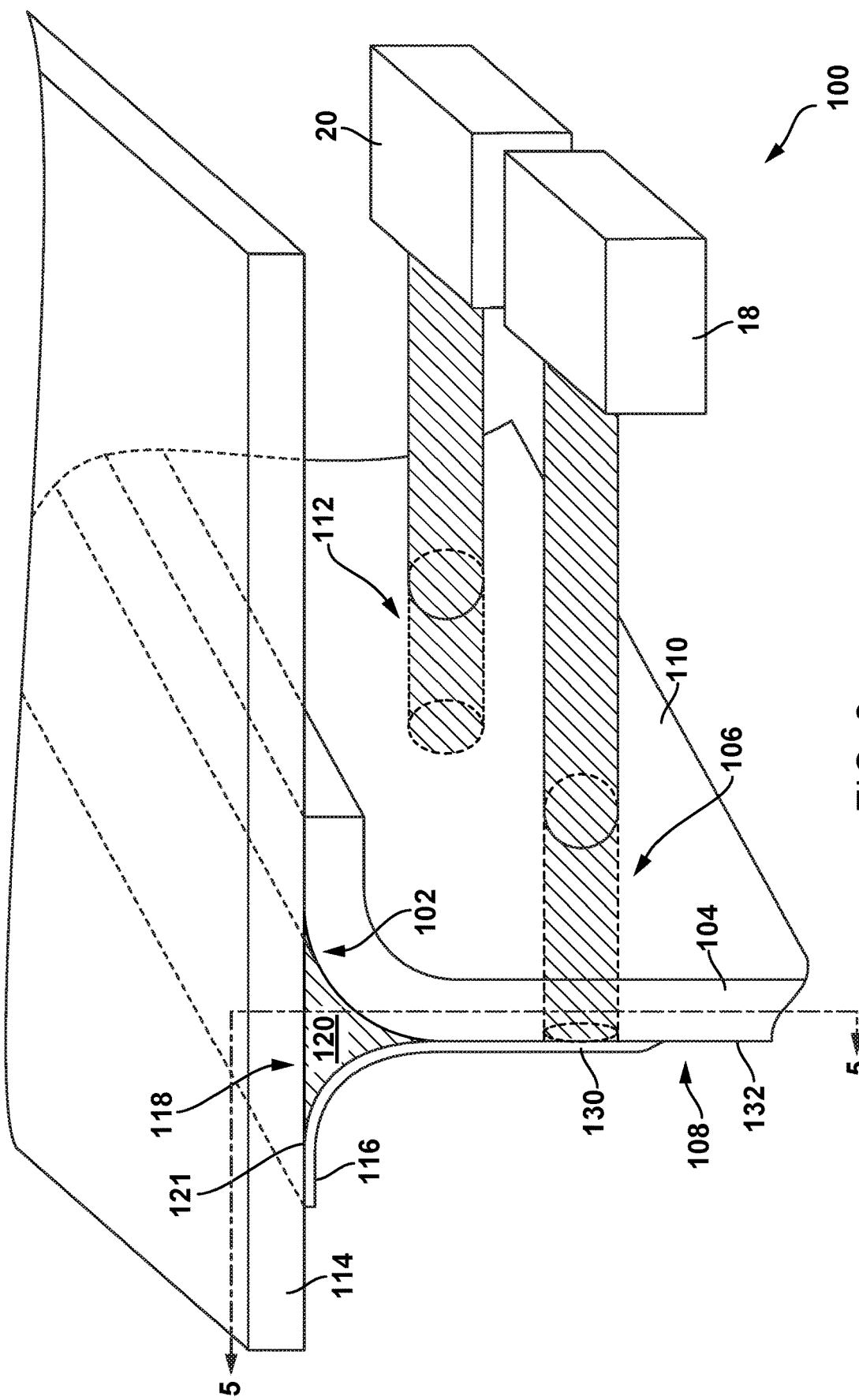
FIG. 2 is a schematic perspective view of a system for forming a seal between structural components, according to an example.

FIG. 2 is a schematic perspective view of the system 100 for forming a seal 102 between the first structural component 104 and the second structural component 114. The system 100 includes the first structural component 104. The first structural component 104 includes a first channel 106 formed between a first side 108 of the first structural component 104 and a second side 110 of the first structural component 104 that is opposite the first side 108. The first structural component 104 also includes a second channel 112 formed between the first side 108 of the first structural component 104 and the second side 110 of the first structural component 104. The system 100 also includes a second structural component 114 and the retainer flap 116. The retainer flap 116, the first side 108 of the first structural component 104, and the second structural component 114 form a cavity 118. A sealant 120 is positioned within the first channel 106, the cavity 118, and the second channel 112.

The seal 102 formed by the sealant 120 can constitute a substantially fluid-tight or a fully fluid-tight seal between the first structural component 104 and the second structural component 114. That is, the seal 102 can form a barrier to air or liquids (e.g., rain, fuel, or deicing chemicals) passing between the first structural component 104 and the second structural component 114. For example, the seal 102 could extend from an inboard end of the first structural component 104 and/or an inboard end of the second structural component 114 to an outboard end of the first structural component 104 and/or an outboard end of the second structural component 114.

The first structural component 104 can take the form of a wing spar that extends in an outboard direction from the fuselage 12 of the aircraft 10. The first structural component 104 can be formed of metal, fiberglass, carbon-fiber, and/or other composite materials.

The first channel 106 can take the form of a hole (e.g., a substantially cylindrical hole) that extends from the first side 108 to the second side 110.

The first side 108 can be an interior side of the first structural component 104. For example, if the first structural component 104 is closer to the leading edge 15 of the wing 14 than the trailing edge 16 of the wing 14, the first side 108 generally would be farther from the leading edge 15 than the second side 110 is from the leading edge 15. If the first structural component 104 is closer to the trailing edge 16 of the wing than the leading edge 15 of the wing, the first side 108 generally would be farther from the trailing edge 16 than the second side 110 is from the trailing edge 16. As such, the second side 110 could be referred to as an exterior side of the first structural component 104.

The second channel 112 can take the form of a hole (e.g., a substantially cylindrical hole) that extends from the first side 108 to the second side 110. For example, the second channel 112 can be inboard or outboard of the first channel 106. In FIG. 2, the first channel 106 and the second channel 112 are shown at substantially the same height, however this is not necessary.

The second structural component 114 can take the form of a wing skin that forms an aerodynamic (e.g., external) surface of the wing 14. As shown in FIG. 2, the second structural component 114 is an upper wing skin of the wing 14. Within other examples of when the second structural component 114 takes the form of a wing skin, the second structural component 114 could be a lower wing skin of the wing 14.

The retainer flap 116 generally takes the form of a flexible and fluid impermeable flap. For example, the retainer flap 116 could include one or more of fiberglass, Carbon Fiber Composite, Titanium, and/or Stainless Steel. The retainer flap 116 is typically bonded to the first side 108 of the first structural component 104 with an adhesive such as epoxy. A first edge 130 of the retainer flap 116 is aligned with a first edge 132 of the first structural component 104. More specifically, the first edge 130 could be adhesively bonded to the first side 108 at the first edge 132. In other examples, the first edge 130 of the retainer flap 116 extends past the first channel 106 but short of the first edge 132 of the first structural component 104 so as to prevent the sealant 120 from escaping from the first channel 106. Thus, the first edge 130 could be adhesively bonded to the first side 108 between the first channel 106 and the first edge 132.

The cavity 118 is formed by and defined by the first side 108 of the first structural component 104, the second structural component 114, and the retainer flap 116.

The sealant 120 can include one or more of silicone, polyurethane, neoprene, epoxy, acrylic/nitrile, methacrylate, polyamide, polysulfide, dichromate, polyethylene, polysulfide manganese dioxide, fluorosilicone, polythioether, fluorocarbon, and/or epichlorohydrin resin.

As such, the retainer flap 116 is placed on (e.g., adhered to) the first side 108 of the first structural component 104 over the first channel 106 and over the second channel 112 such that the retainer flap 116, the first side 108 of the first structural component 104, and the second structural component 114 form the cavity 118. Additionally, a pump 18 can be connected to the first channel 106 at the second side 110 of the first structural component 104 and a container 20 holding the sealant 120 can be connected to the second channel 112 at the second side 110 of the first structural component 104. The pump 18 is configured for pumping the sealant 120 into the cavity 118 and the container 20 is configured for storing the sealant 120.

Next, the cavity 118 is evacuated through the first channel 106 (e.g., using the pump 18), thereby forcing the retainer flap 116 against the second structural component 114. This generally causes the sealant 120 to flow from the container 20 through the second channel 112 and into the cavity 118, as is discussed in more detail below. In some examples, the retainer flap 116 is bent toward the first structural component 104 or the second structural component 114 such that the retainer flap 116 forms a seal 121 against the second structural component 114.

Figure 3:
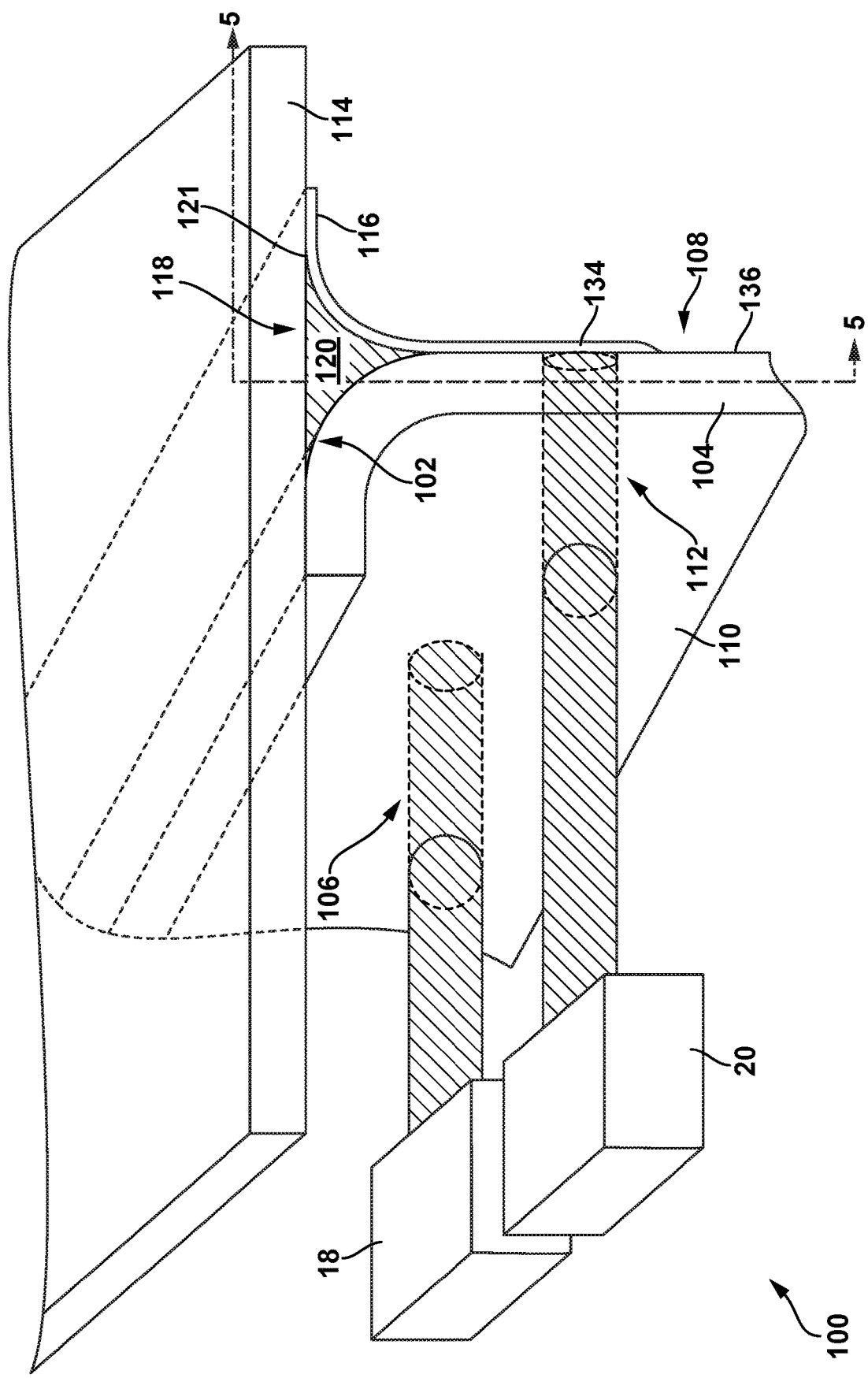
FIG. 3 is a schematic perspective view of a system for forming a seal between structural components, according to an example.

FIG. 3 is a schematic perspective view of the system 100 from a perspective that is opposite that shown in FIG. 2.

A second edge 134 of the retainer flap 116 is aligned with a second edge 136 of the first structural component 104. More specifically, the second edge 134 of the retainer flap 116 could be adhesively bonded to the first side 108 at the second edge 136 of the first structural component 104. In other examples, the second edge 134 of the retainer flap 116 extends past the second channel 112 but short of the second edge 136 of the first structural component 104 so as to prevent the sealant 120 from escaping from the second channel 112. Thus, the second edge 134 of the retainer flap 116 could be adhesively bonded to the first side 108 between the second channel 112 and the second edge 136 of the first structural component 104.

Figure 4:
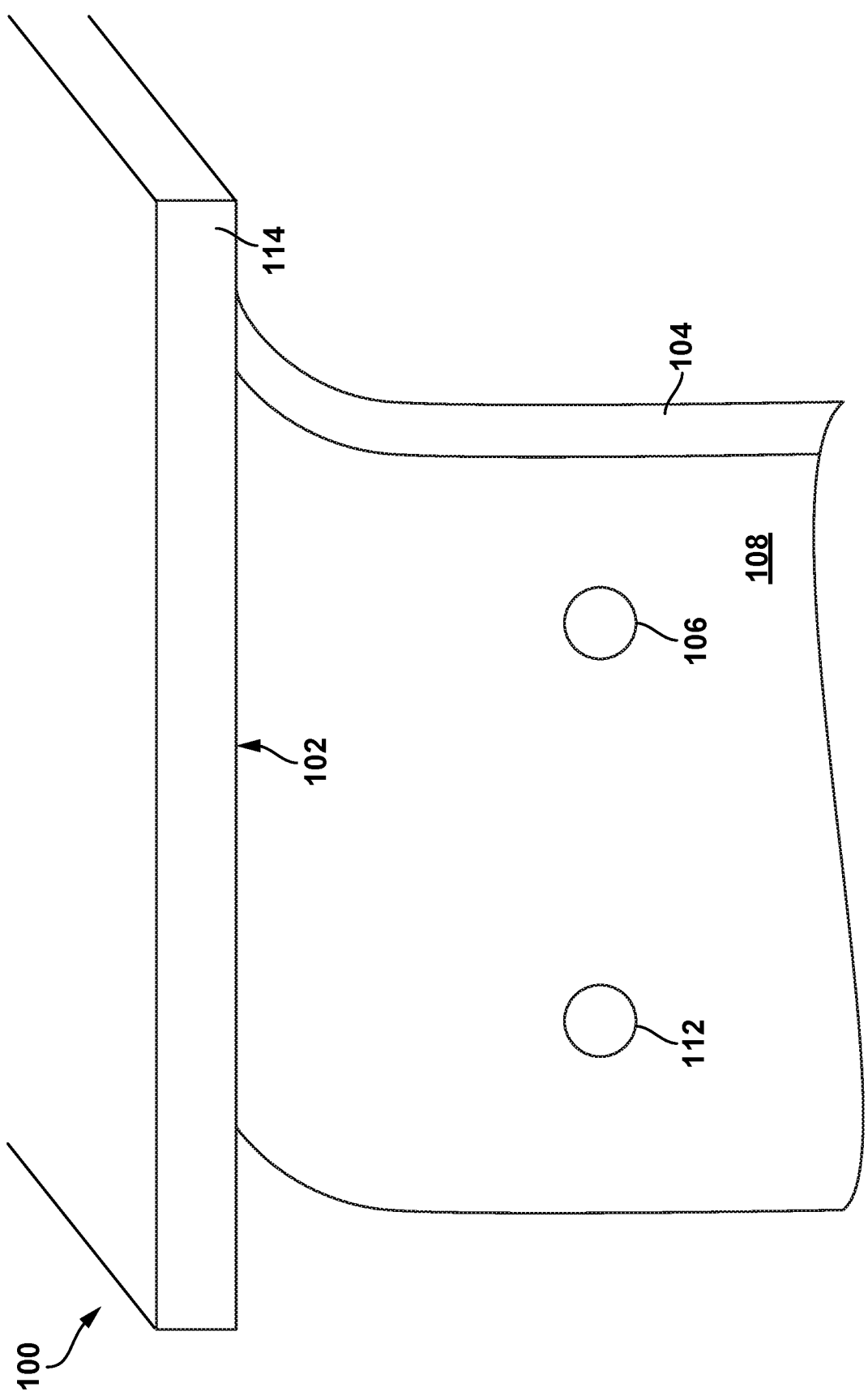
FIG. 4 is a schematic view of structural components, according to an example.

FIG. 4 is a schematic view of the first structural component 104 and the second structural component 114 prior to the retainer flap 116 being placed on (e.g., adhered to) the first side 108 of the first structural component 104. As such, the first channel 106 and the second channel 112 are exposed. FIG. 4 shows where the seal 102 will be formed between the first structural component 104 and the second structural component 114 after placing the retainer flap 116 on the first side 108 of the first structural component 104.

Figure 5:
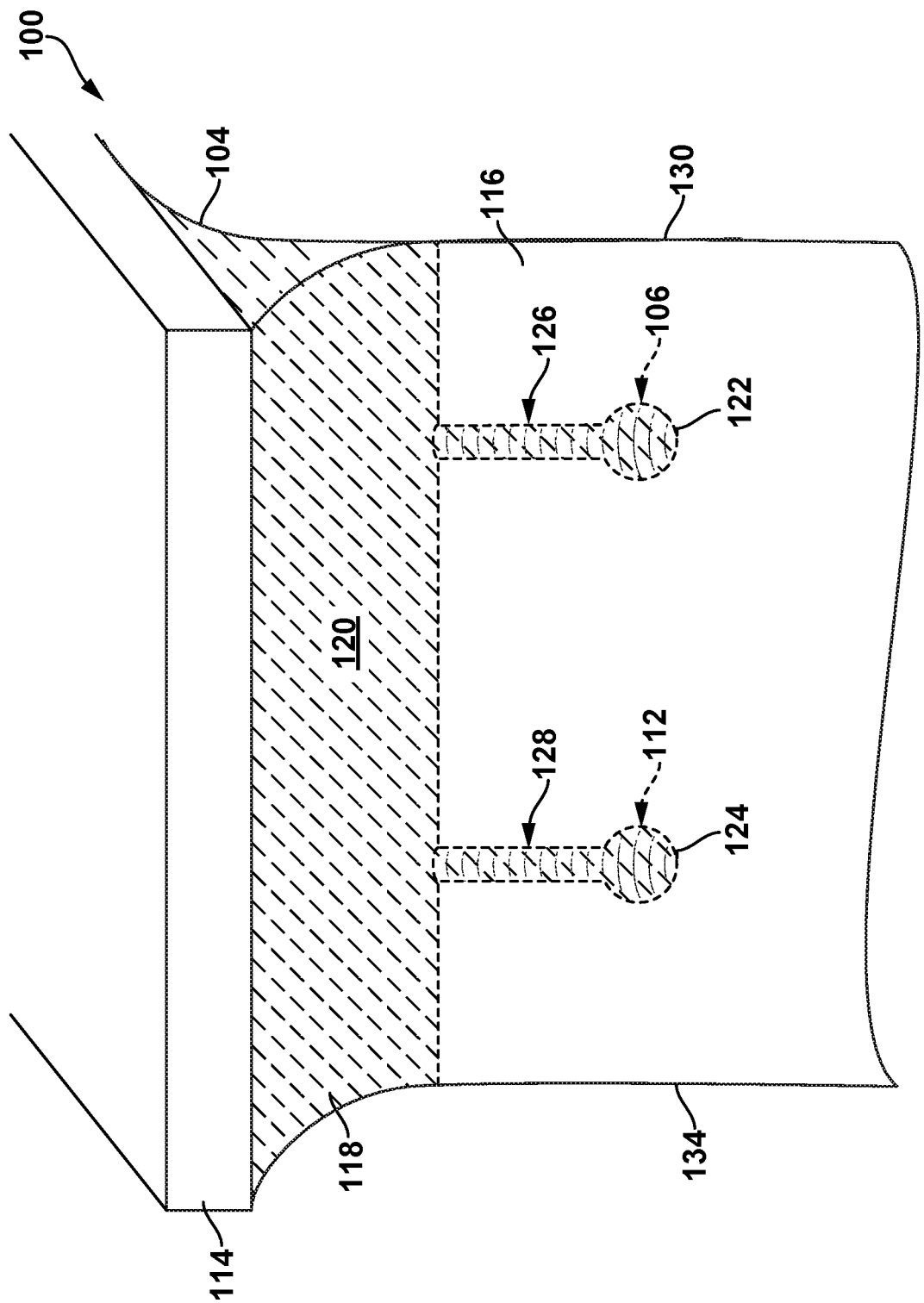
FIG. 5 is a schematic view of a system for forming a seal between structural components, according to an example.

FIG. 5 is a schematic view of the system 100 after the retainer flap 116 has been placed on (e.g., adhered to) the first side 108 of the first structural component 104.

The retainer flap 116 includes a first raised portion 122 over the first channel 106 and a second raised portion 124 over the second channel 112. The sealant 120 is positioned within the first raised portion 122 and the second raised portion 124. The first raised portion 122 and the second raised portion 124 are typically similar in shape (e.g., circular) compared to the first channel 106 and the second channel 112, respectively, but other examples are possible. The first raised portion 122 and the second raised portion 124 are raised (e.g., an indent in the retainer flap 116, such as an indent in the retainer flap indented out of the page as illustrated) with respect to the first side 108 of the first structural component 104 to allow sealant 120 to flow from the second channel 112, between the retainer flap 116 and the first side 108 of the first structural component 104, into the cavity 118 and thereafter into the first channel 106.

The retainer flap 116 also includes a third raised portion 126 that extends between the first channel 106 (e.g., the first raised portion 122) and the cavity 118 and a fourth raised portion 128 that extends between the second channel 112 (e.g., the second raised portion 124) and the cavity 118. The sealant 120 is positioned within the third raised portion 126 and the fourth raised portion 128. The third raised portion 126 and the fourth raised portion 128 are raised (e.g., an indent in the retainer flap 116, such as an indent in the retainer flap indented out of the page as illustrated) with respect to the first side 108 of the first structural component 104 to allow sealant 120 to flow from the second channel 112, between the retainer flap 116 and the first side 108 of the first structural component 104, into the cavity 118 and thereafter into the first channel 106.

As such, placing the retainer flap 116 on the first side 108 of the first structural component 104 can include placing the first raised portion 122 of the retainer flap 116 over the first channel 106 and/or placing the second raised portion 124 over the second channel 112.

Additionally, placing the retainer flap 116 on the first side 108 of the first structural component 104 can include placing the third raised portion 126 of the retainer flap 116 over the first side 108 of the first structural component 104 such that the third raised portion 126 extends between the first channel 106 and the cavity 118 and can include placing the fourth raised portion 128 of the retainer flap 116 over the first side 108 of the first structural component 104 such that the fourth raised portion 128 extends between the second channel 112 and the cavity 118.

In some examples, a technician may form the first channel 106 and the second channel 112 via drilling. Other examples are possible.

The sealant 120 may be forced by the pump 18 into the second channel 112 from the container 20, through the second raised portion 124 and the fourth raised portion 128 into the cavity 118, through the third raised portion 126 and the first raised portion 122, and through the first channel 106, thereby filling the cavity 118.

As such, the sealant 120 can be forced to flow and substantially fill the first channel 106, the cavity 118, and the second channel 112. For example, the sealant 120 substantially filling the first channel 106, the cavity 118, and the second channel 112 can mean filling at least 85%, 90%, 95%, or 99% of a total volume of the first channel 106, the cavity 118, and the second channel 112. Within examples, the sealant 120 completely fills the total volume of the first channel 106, the cavity 118, and the second channel 112.

In some examples, the sealant 120 can be forced to flow and substantially fill the first channel 106, the first raised portion 122, the third raised portion 126, the cavity 118, the fourth raised portion 128, the second raised portion 124, and the second channel 112. For example, the sealant 120 substantially filling the first channel 106, the first raised portion 122, the third raised portion 126, the cavity 118, the fourth raised portion 128, the second raised portion 124, and the second channel 112 can mean filling at least 85%, 90%, 95%, or 99% of a total volume of the first channel 106, the first raised portion 122, the third raised portion 126, the cavity 118, the fourth raised portion 128, the second raised portion 124, and the second channel 112. Within examples, the sealant 120 completely fills the total volume of the first channel 106, the first raised portion 122, the third raised portion 126, the cavity 118, the fourth raised portion 128, the second raised portion 124, and the second channel 112. In some examples, the cavity 118 is less than fully filled with the sealant 120 but the thickness of the sealant 120 over gaps between the first structural component 104 and the second structural component 114 is sufficient to form a fluid seal.

Figure 8:
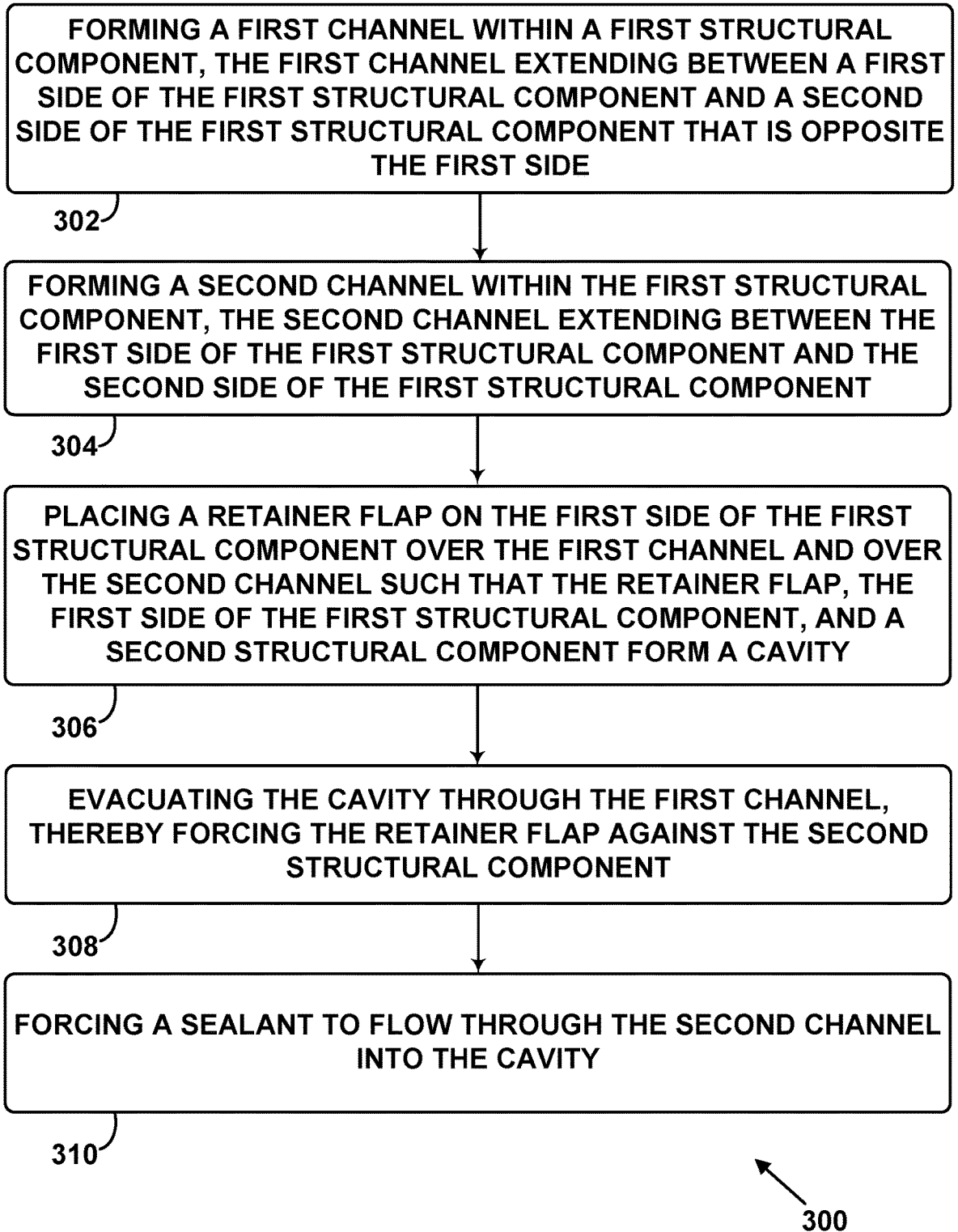
FIG. 8 is a block diagram of a method, according to an example.

FIGS. 6-8 are block diagrams of methods 200, 250, and 300 for forming a seal between structural components. The methods 200, 250, and 300 present examples of methods that could be used with the system 100 as shown in FIGS. 1-5. As shown in FIGS. 6-8, the methods 200, 250, and 300 include one or more operations, functions, or actions as illustrated by blocks 202, 204, 206, 208, 302, 304, 306, 308, and 310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

FIG. 6 is a block diagram of the method 200.

At block 202, the method 200 includes placing the retainer flap 116 on the first side 108 of the first structural component 104 over the first channel 106 within the first structural component 104 and over the second channel 112 within the first structural component 104 such that the retainer flap 116, the first side 108 of the first structural component 104, and the second structural component 114 form the cavity 118. The first channel 106 extends between the first side 108 of the first structural component 104 and the second side 110 of the first structural component 104 that is opposite the first side 108. The second channel 112 extends between the first side 108 of the first structural component 104 and the second side 110 of the first structural component 104.

At block 204, the method 200 includes evacuating the cavity 118 through the first channel 106, thereby forcing the retainer flap 116 against the second structural component 114.

At block 206, the method 200 includes forcing the sealant 120 to flow through the second channel 112 into the cavity 118.

FIG. 7 is a block diagram of the method 250.

At block 208, the method 250 includes connecting the pump 18 to the first channel 106 at the second side 110 of the first structural component 104.

FIG. 8 is a block diagram of the method 300.

At block 302, the method 300 includes forming the first channel 106 within the first structural component 104, the first channel 106 extending between the first side 108 of the first structural component 104 and the second side 110 of the first structural component 104 that is opposite the first side 108.

At block 304, the method 300 includes forming the second channel 112 within the first structural component 104, the second channel 112 extending between the first side 108 of the first structural component 104 and the second side 110 of the first structural component 104.

At block 306, the method 300 includes placing the retainer flap 116 on the first side 108 of the first structural component 104 over the first channel 106 and over the second channel 112 such that the retainer flap 116, the first side 108 of the first structural component 104, and the second structural component 114 form the cavity 118.

At block 308, the method 300 includes evacuating the cavity 118 through the first channel 106, thereby forcing the retainer flap 116 against the second structural component 114.

At block 310, the method 300 includes forcing the sealant 120 to flow through the second channel 112 into the cavity 118.

Examples of the present disclosure can thus relate to one of the enumerated clauses (ECs) listed below.

EC 1 is a method for forming a seal between structural components, the method comprising: placing a retainer flap on a first side of a first structural component over a first channel within the first structural component and over a second channel within the first structural component such that the retainer flap, the first side of the first structural component, and a second structural component form a cavity, wherein the first channel extends between the first side of the first structural component and a second side of the first structural component that is opposite the first side, and wherein the second channel extends between the first side of the first structural component and the second side of the first structural component; evacuating the cavity through the first channel, thereby forcing the retainer flap against the second structural component; and forcing a sealant to flow through the second channel into the cavity.

EC 2 is the method of EC 1, wherein placing the retainer flap on the first side of the first structural component comprises adhering the retainer flap to the first side of the first structural component.

EC 3 is the method of any of ECs 1-2, wherein placing the retainer flap on the first side of the first structural component comprises placing a first raised portion of the retainer flap over the first channel.

EC 4 is the method of EC 3, wherein forcing the sealant to flow through the second channel into the cavity comprises forcing the sealant to fill the first raised portion of the retainer flap.

EC 5 is the method of EC 4, wherein placing the retainer flap on the first side of the first structural component further comprises placing a third raised portion of the retainer flap over the first side of the first structural component such that the third raised portion extends between the first channel and the cavity.

EC 6 is the method of EC 5, wherein forcing the sealant to flow through the second channel into the cavity comprises forcing the sealant to fill the third raised portion.

EC 7 is the method of any of ECs 3-6, wherein placing the retainer flap on the first side of the first structural component further comprises placing a second raised portion of the retainer flap over the second channel.

EC 8 is the method of EC 7, wherein forcing the sealant to flow through the second channel into the cavity comprises forcing the sealant to fill the second raised portion of the retainer flap.

EC 9 is the method of any of ECs 7-8, wherein placing the retainer flap on the first side of the first structural component further comprises placing a fourth raised portion of the retainer flap over the first side of the first structural component such that the fourth raised portion extends between the second channel and the cavity.

EC 10 is the method of EC 9, wherein forcing the sealant to flow through the second channel into the cavity comprises forcing the sealant to fill the fourth raised portion.

EC 11 is the method of any of ECs 1-10, wherein forcing the retainer flap against the second structural component comprises bending the retainer flap toward the first structural component or the second structural component such that the retainer flap forms a seal against the second structural component.

EC 12 is the method of any of ECs 1-11, further comprising: connecting a pump to the first channel at the second side of the first structural component, wherein evacuating the cavity through the first channel comprises evacuating the cavity by using the pump.

EC 13 is the method of any of ECs 1-12, wherein forcing the sealant to flow through the second channel into the cavity comprises forcing the sealant to flow such that the sealant substantially fills the first channel, the cavity, and the second channel.

EC 14 is the method of any of ECs 1-13, wherein the first structural component comprises a wing spar and the second structural component comprises a wing skin.

EC 15 is a system for forming a seal between structural components, the system comprising: a first structural component comprising: a first channel formed between a first side of the first structural component and a second side of the first structural component that is opposite the first side; and a second channel formed between the first side of the first structural component and the second side of the first structural component; a second structural component; a retainer flap, wherein the retainer flap, the first side of the first structural component, and the second structural component form a cavity; and a sealant positioned within the first channel, the cavity, and the second channel.

EC 16 is the system of EC 15, wherein the retainer flap comprises: a first raised portion over the first channel; and a second raised portion over the second channel.

EC 17 is the system of EC 16, wherein the sealant is further positioned within the first raised portion and the second raised portion.

EC 18 is the system of any of ECs 15-16, wherein the retainer flap comprises: a third raised portion that extends between the first channel and the cavity; and a fourth raised portion that extends between the second channel and the cavity.

EC 19 is the system of EC 18, wherein the sealant is further positioned within the third raised portion and the fourth raised portion.

EC 20 is the system of any of ECs 15-19, wherein the first structural component comprises a wing spar and the second structural component comprises a wing skin.

EC 21 is a method for forming a seal between structural components, the method comprising: forming a first channel within a first structural component, the first channel extending between a first side of the first structural component and a second side of the first structural component that is opposite the first side; forming a second channel within the first structural component, the second channel extending between the first side of the first structural component and the second side of the first structural component; placing a retainer flap on the first side of the first structural component over the first channel and over the second channel such that the retainer flap, the first side of the first structural component, and a second structural component form a cavity; evacuating the cavity through the first channel, thereby forcing the retainer flap against the second structural component; and forcing a sealant to flow through the second channel into the cavity.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method for forming a seal between structural components, the method comprising:
   placing a retainer flap on a first side of a first structural component over a first channel within the first structural component and over a second channel within the first structural component such that the retainer flap, the first side of the first structural component, and a second structural component form a cavity, wherein the first channel extends between the first side of the first structural component and a second side of the first structural component that is opposite the first side, and wherein the second channel extends between the first side of the first structural component and the second side of the first structural component;
   evacuating the cavity through the first channel, thereby forcing the retainer flap against the second structural component; and
   forcing a sealant to flow through the second channel into the cavity.

2. The method of claim 1, wherein placing the retainer flap on the first side of the first structural component comprises adhering the retainer flap to the first side of the first structural component.

3. The method of claim 1, wherein placing the retainer flap on the first side of the first structural component comprises placing a first raised portion of the retainer flap over the first channel.

4. The method of claim 3, wherein forcing the sealant to flow through the second channel into the cavity comprises forcing the sealant to fill the first raised portion of the retainer flap.

5. The method of claim 4, wherein placing the retainer flap on the first side of the first structural component further comprises placing a third raised portion of the retainer flap over the first side of the first structural component such that the third raised portion extends between the first channel and the cavity.

6. The method of claim 5, wherein forcing the sealant to flow through the second channel into the cavity comprises forcing the sealant to fill the third raised portion.

7. The method of claim 3, wherein placing the retainer flap on the first side of the first structural component further comprises placing a second raised portion of the retainer flap over the second channel.

8. The method of claim 7, wherein forcing the sealant to flow through the second channel into the cavity comprises forcing the sealant to fill the second raised portion of the retainer flap.

9. The method of claim 7, wherein placing the retainer flap on the first side of the first structural component further comprises placing a fourth raised portion of the retainer flap over the first side of the first structural component such that the fourth raised portion extends between the second channel and the cavity.

10. The method of claim 9, wherein forcing the sealant to flow through the second channel into the cavity comprises forcing the sealant to fill the fourth raised portion.

11. The method of claim 1, wherein forcing the retainer flap against the second structural component comprises bending the retainer flap toward the first structural component or the second structural component such that the retainer flap forms a seal against the second structural component.

12. The method of claim 1, further comprising:
connecting a pump to the first channel at the second side of the first structural component,
wherein evacuating the cavity through the first channel comprises evacuating the cavity by using the pump.

13. The method of claim 1, wherein forcing the sealant to flow through the second channel into the cavity comprises forcing the sealant to flow such that the sealant substantially fills the first channel, the cavity, and the second channel.

14. The method of claim 1, wherein the first structural component comprises a wing spar and the second structural component comprises a wing skin.

15. A system for forming a seal between structural components, the system comprising:
a first structural component comprising:
a first channel that extends between a first side of the first structural component and a second side of the first structural component that is opposite the first side; and
a second channel that extends between the first side of the first structural component and the second side of the first structural component;
a second structural component;
a retainer flap, wherein the retainer flap, the first side of the first structural component, and the second structural component form a cavity; and
a sealant positioned within the first channel, the cavity, and the second channel.

16. The system of claim 15, wherein the retainer flap comprises:
a first raised portion over the first channel; and
a second raised portion over the second channel.

17. The system of claim 16, wherein the sealant is further positioned within the first raised portion and the second raised portion.

18. The system of claim 15, wherein the retainer flap comprises:
a third raised portion that extends between the first channel and the cavity; and
a fourth raised portion that extends between the second channel and the cavity.

19. The system of claim 18, wherein the sealant is further positioned within the third raised portion and the fourth raised portion.

20. The system of claim 15, wherein the first structural component comprises a wing spar and the second structural component comprises a wing skin.

21. A method for forming a seal between structural components, the method comprising:
forming a first channel within a first structural component, the first channel extending between a first side of the first structural component and a second side of the first structural component that is opposite the first side;
forming a second channel within the first structural component, the second channel extending between the first side of the first structural component and the second side of the first structural component;
placing a retainer flap on the first side of the first structural component over the first channel and over the second channel such that the retainer flap, the first side of the first structural component, and a second structural component form a cavity;
evacuating the cavity through the first channel, thereby forcing the retainer flap against the second structural component; and
forcing a sealant to flow through the second channel into the cavity.

* * * * *